(12) United States Patent
Kogetsu et al.

(10) Patent No.: US 9,620,768 B2
(45) Date of Patent: Apr. 11, 2017

(54) NEGATIVE ELECTRODE FOR LITHIUM SECONDARY BATTERIES, LITHIUM SECONDARY BATTERY, AND METHOD FOR PRODUCING THE NEGATIVE ELECTRODE FOR LITHIUM SECONDARY BATTERIES

(71) Applicant: SANYO Electric Co., Ltd., Moriguchi-shi, Osaka (JP)

(72) Inventors: Yasutaka Kogetsu, Osaka (JP); Kunihiko Bessho, Osaka (JP); Takashi Shimada, Osaka (JP)

(73) Assignee: SANYO Electric Co., Ltd., Daito-shi, Osaka (JP)

( * ) Notice: Subject to any disclaimer, the term of this patent is extended or adjusted under 35 U.S.C. 154(b) by 119 days.

(21) Appl. No.: 14/400,973

(22) PCT Filed: May 20, 2013

(86) PCT No.: PCT/JP2013/063890
§ 371 (c)(1),
(2) Date: Nov. 13, 2014

(87) PCT Pub. No.: WO2013/176068
PCT Pub. Date: Nov. 28, 2013

(65) Prior Publication Data
US 2015/0147656 A1    May 28, 2015

(30) Foreign Application Priority Data
May 22, 2012   (JP) ................ 2012-116793

(51) Int. Cl.
H01M 2/26     (2006.01)
H01M 2/24     (2006.01)
(Continued)

(52) U.S. Cl.
CPC ............ H01M 4/133 (2013.01); H01M 2/26 (2013.01); H01M 4/0404 (2013.01);
(Continued)

(58) Field of Classification Search
None
See application file for complete search history.

(56) References Cited

U.S. PATENT DOCUMENTS

2005/0079421 A1   4/2005   Konishiike et al.

FOREIGN PATENT DOCUMENTS

JP    8-102333 A     4/1996
JP    2005-85633 A   3/2005
(Continued)

OTHER PUBLICATIONS

English translation of JP2005235617 (2005).*
International Search Report dated Jun. 25, 2013 issued in corresponding application No. PCT/JP2013/063890.

*Primary Examiner* — Yoshitoshi Takeuchi
(74) *Attorney, Agent, or Firm* — Westerman, Hattori, Daniels & Adrian, LLP (57) ABSTRACT

A negative electrode 1 for lithium secondary batteries, which can increase the charge/discharge capacity of a lithium secondary battery, includes a negative electrode current collector, a negative electrode active material layer, and a lithium layer. The negative electrode active material layer is disposed on regions and of the respective surfaces and of the negative electrode current collector. The lithium layer is disposed on uncovered regions and, which are regions of the respective surfaces and of the negative electrode current collector on which the negative electrode active material layer is not disposed. The lithium layer includes lithium.

7 Claims, 5 Drawing Sheets (51) Int. Cl.
    *H01M 2/22*           (2006.01)
    *H01M 10/0525*    (2010.01)
    *H01M 4/133*       (2010.01)
    *H01M 4/13*         (2010.01)
    *H01M 4/139*       (2010.01)
    *H01M 4/04*         (2006.01)
    *H01M 4/1393*      (2010.01)
    H01M 10/052      (2010.01)
    H01M 4/36         (2006.01)
    H01M 4/131       (2010.01)
    H01M 4/02         (2006.01)

(52) U.S. Cl.
    CPC ....... *H01M 4/0421* (2013.01); *H01M 4/0423* (2013.01); *H01M 4/0471* (2013.01); *H01M 4/13* (2013.01); *H01M 4/139* (2013.01); *H01M 4/1393* (2013.01); *H01M 10/0525* (2013.01); *H01M 4/131* (2013.01); *H01M 4/366* (2013.01); *H01M 10/052* (2013.01); *H01M 2004/027* (2013.01); *H01M 2004/028* (2013.01); *H01M 2220/30* (2013.01); *Y10T 29/49224* (2015.01)

(56) References Cited

FOREIGN PATENT DOCUMENTS

| | | | |
|---|---|---|---|
| JP | 2005-234617 A | 9/2005 | |
| JP | 2005235617 | * 9/2005 | ............ H01M 10/05 |
| JP | 2007-328932 A | 12/2007 | |

\* cited by examiner

NEGATIVE ELECTRODE FOR LITHIUM SECONDARY BATTERIES, LITHIUM SECONDARY BATTERY, AND METHOD FOR PRODUCING THE NEGATIVE ELECTRODE FOR LITHIUM SECONDARY BATTERIES

TECHNICAL FIELD

The present invention relates to a negative electrode for lithium secondary batteries, a lithium secondary battery, and a method for producing the negative electrode for lithium secondary batteries.

BACKGROUND ART

Hitherto, lithium secondary batteries have been widely used for electronic devices such as mobile telephones, notebook computers, and PDAs. Graphite materials have been widely used as negative electrode active materials for lithium secondary batteries.

Recently, use of materials capable of being alloyed with lithium, such as silicon, as negative electrode active materials have been studied in order to, for example, increase the capacities of lithium secondary batteries. For example, PTL 1 discloses a negative electrode including a negative electrode active material layer including silicon.

However, lithium occluded in a material capable of being alloyed with lithium during the first charge is less likely to be released when discharging is performed subsequently. Therefore, a lithium secondary battery in which a material capable of being alloyed with lithium is used as a negative electrode active material is likely to have a low charge/discharge efficiency during the first charge and discharge and may have a low charge/discharge capacity during the second and later charges and discharges.

In order to address the above issues, for example, PTL 1 discloses a technique in which lithium is occluded into a negative electrode active material layer in advance by depositing metal lithium on the surface of the negative electrode active material layer by a gas phase method.

CITATION LIST

Patent Literature

PTL 1: Japanese Published Unexamined Patent Application No. 2005-85633

SUMMARY OF INVENTION

Technical Problem

Under the above-described circumstances, there has been a demand for a further increase in the charge/discharge capacity of a lithium secondary battery in which a material capable of being alloyed with lithium is used as a negative electrode active material.

A main object of the present invention is to increase the charge/discharge capacity of a lithium secondary battery.

Solution to Problem

The present invention provides a negative electrode for lithium secondary batteries, the negative electrode including a negative electrode current collector, a negative electrode active material layer, and a lithium layer. The negative electrode active material layer is disposed on a region of a surface of the negative electrode current collector. The lithium layer is disposed on an uncovered region, which is a region of the surface of the negative electrode current collector on which the negative electrode active material layer is not disposed. The lithium layer includes metal lithium.

The present invention also provides a lithium secondary battery including the above-described negative electrode for lithium secondary batteries, a positive electrode, a nonaqueous electrolyte, and a separator. The separator is disposed between the positive electrode and the negative electrode for lithium secondary batteries.

The present invention further provides a method for producing a negative electrode for lithium secondary batteries, the method including forming a negative electrode active material layer on a region of a surface of a negative electrode current collector and forming a lithium layer on a surface of the negative electrode active material layer and on an uncovered region, which is a region of the surface of the negative electrode current collector on which the negative electrode active material layer is not disposed.

Advantageous Effects of Invention

According to the present invention, the charge/discharge capacity of a lithium secondary battery may be increased.

DESCRIPTION OF EMBODIMENTS

Hereinafter, an example of preferred embodiments of the present invention is described. Note that the following embodiment is merely an example and does not limit the present invention.

Throughout the attached drawings referred to in the embodiment and the like, members having substantially the same function are referred to with the same reference numeral. The drawings referred to in the embodiment and the like are schematic, and the proportions and the like of the dimensions of objects illustrated in the drawings may differ from those of the actual objects. The proportions and the like of the dimensions of the objects may differ also among drawings. The specific proportions and the like of the dimensions of objects are to be determined with consideration of the following description.

(Structure of Negative Electrode 1 for Lithium Secondary Batteries)

Figure 1:
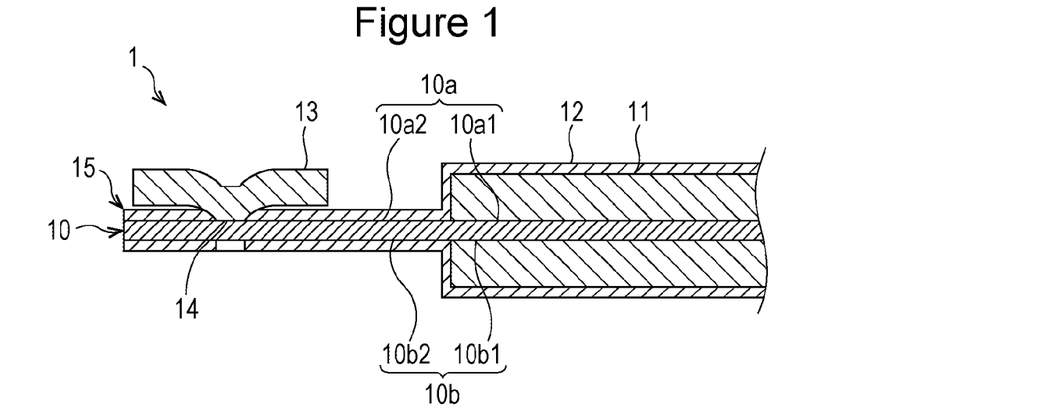
FIG. 1 is a schematic cross-sectional view of a negative electrode for lithium secondary batteries according to an embodiment of the present invention.
Figure 2:
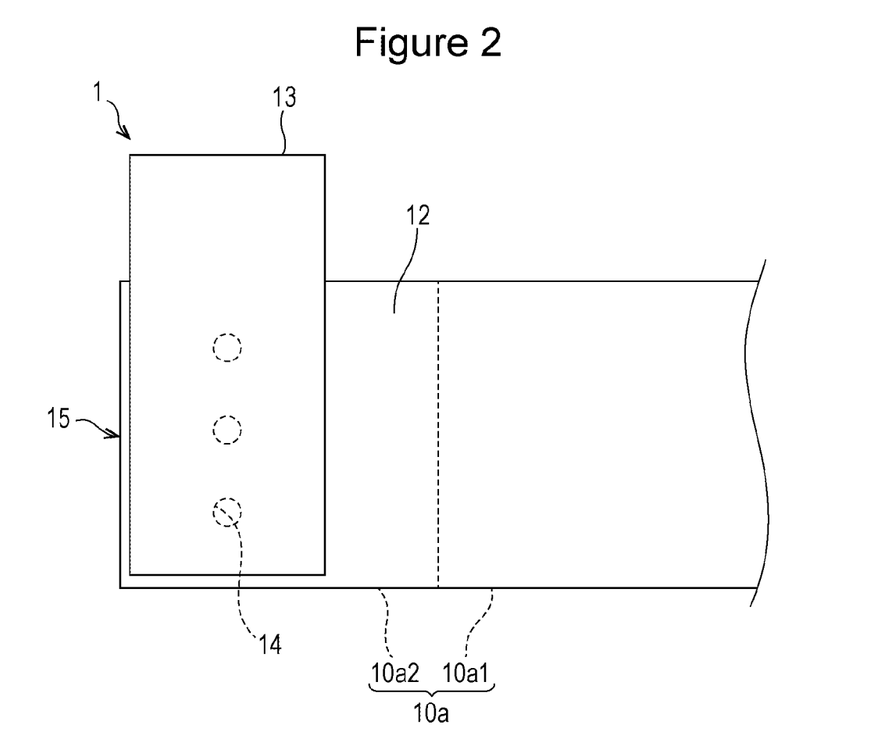
FIG. 2 is a schematic plan view of a negative electrode for lithium secondary batteries according to an embodiment of the present invention.

FIGS. 1 and 2 illustrate a negative electrode 1 for lithium secondary batteries, which is a negative electrode that has not yet been installed in a secondary battery. Thus, the negative electrode 1 for lithium secondary batteries is a negative electrode that has not yet been subjected to charging and discharging.

The negative electrode 1 for lithium secondary batteries includes a negative electrode lead 13 and a negative electrode plate 15. The negative electrode plate 15 includes a negative electrode current collector 10, a negative electrode active material layer 11, and a lithium layer 12.

The negative electrode current collector 10 may be composed of, for example, any of publicly known conductive materials used for producing lithium secondary batteries. A preferred example of the negative electrode current collector 10 is a nonporous conductive substrate. Examples of preferred forms of the negative electrode current collector 10 include a foil, a sheet, and a film. Examples of preferred materials of the negative electrode current collector 10 include stainless steel, titanium, nickel, copper, and a copper alloy. The thickness of the negative electrode current collector 10 is preferably within about 1 to 500 µm, is more preferably within about 1 to 50 µm, is further preferably within about 10 to 40 µm, and is particularly preferably within about 10 to 30 µm. Using the negative electrode 1 including the negative electrode current collector 10 having a thickness falling within the above-described range, the charge/discharge capacity of a lithium secondary battery may be further increased.

The negative electrode active material layer 11 is disposed on regions 10a1 and 10b1 of the respective surfaces 10a and 10b of the negative electrode current collector 10. In the present invention, the negative electrode active material layer may be disposed on only one surface of the negative electrode current collector.

The surfaces 10a and 10b of the negative electrode current collector 10 include uncovered regions 10a2 and 10b2, respectively, which are regions of the surfaces 10a and 10b of the negative electrode current collector 10 on which the negative electrode active material layer 11 is not disposed. The uncovered regions 10a2 and 10b2 are located at the end of the negative electrode current collector 10 in the longitudinal direction of the negative electrode current collector 10.

The negative electrode active material layer 11 includes a negative electrode active material. The negative electrode active material may be, for example, any of publicly known negative electrode active materials used for producing lithium secondary batteries. Preferred examples of the negative electrode active material include a carbon-based active material, an alloy-based active material, and a mixture of a carbon-based active material and an alloy-based active material.

Preferred examples of the carbon-based active material include artificial graphite, natural graphite, non-graphitizable carbon, and graphitizable carbon.

Under a negative electrode potential, during charge, the alloy-based active material is alloyed with lithium and thereby lithium is occluded into the alloy-based active material and, during discharge, the alloy-based active material releases lithium. Preferred examples of the alloy-based active material include a silicon-based active material including silicon and a tin-based active material including tin. The alloy-based active material is more preferably a silicon-based active material.

Preferred examples of the silicon-based active material include silicon, a silicon compound, a partially substituted product of silicon or a silicon compound, and a solid solution of silicon or a silicon compound. Preferred examples of the silicon compound include a silicon oxide, a silicon carbide, a silicon nitride, and a silicon alloy.

A preferred example of the silicon oxide is a silicon oxide expressed by $SiO_a$ ($0.05<a<1.95$). A preferred example of the silicon carbide is a silicon carbide expressed by $SiC_b$ ($0<b<1$). A preferred example of the silicon nitride is a silicon nitride expressed by $SiN_c$ ($0<c<4/3$). The silicon alloy is an alloy of silicon with at least one element (A1) other than Si. Examples of the element (A1) other than Si include Fe, Co, Sb, Bi, Pb, Ni, Cu, Zn, Ge, In, Sn, and Ti. The partially substituted product of silicon and the partially substituted product of a silicon compound are compounds in which silicon or silicon included in the silicon compound is partially replaced by at least one element (A2) other than Si. Examples of the element (A2) other than Si include B, Mg, Ni, Ti, Mo, Co, Ca, Cr, Cu, Fe, Mn, Nb, Ta, V, W, Zn, C, N, and Sn. The silicon compound is preferably a silicon oxide.

Preferred examples of the tin-based active material include tin, a tin oxide, a tin nitride, a tin alloy, a tin compound, and solid solutions of these substances. Preferred examples of the tin oxide include $SnO_d$ ($0<d<2$) and $SnO_2$. Preferred examples of the tin alloy include a Ni—Sn alloy, a Mg—Sn alloy, an Fe—Sn alloy, a Cu—Sn alloy, and a Ti—Sn alloy. Preferred examples of the tin compound include $SnSiO_3$, $Ni_2Sn_4$, and $Mg_2Sn$. The tin-based active material is preferably a tin oxide.

In order to further increase the charge/discharge capacity of a lithium secondary battery, the negative electrode active material layer preferably include the alloy-based active material and more preferably include silicon.

The negative electrode active material layer 11 may include only one type of negative electrode active material or may include plural types of negative electrode active materials.

The average diameter of particles of the negative electrode active material is preferably within about 1 to 100 µm.

The negative electrode active material layer 11 preferably further include a binding agent, a conductant agent, and the like. Preferred examples of the binding agent include, specifically, carboxymethylcellulose and a styrene-butadiene rubber.

The negative electrode lead 13 is connected to the uncovered region 10a2 of the negative electrode current collector 10. A material constituting the negative electrode lead 13 is not particularly limited and may be any conductive material. The negative electrode lead 13 preferably include, for example, at least one substance selected from nickel, a nickel alloy, copper, and a copper alloy. Preferred examples of the nickel alloy include a nickel-silicon alloy, a nickel-tin alloy, a nickel-cobalt alloy, a nickel-iron alloy, and a nickel-manganese alloy. Preferred examples of the copper alloy include a copper-nickel alloy, a copper-iron alloy, a copper-silver alloy, a copper-phosphorus alloy, a copper-aluminum alloy, a copper-silicon alloy, a copper-tin alloy, a copper-zirconia alloy, and a copper-beryllium alloy. In order to increase the strength of the joint between the negative electrode current collector 10 and the negative electrode lead 13, the negative electrode lead 13 preferably include nickel, copper, a copper-nickel alloy, or the like. The negative electrode lead 13 may be composed of a cladding material including copper and nickel. The negative electrode lead 13 can be produced by forming any of the above-described materials into a general form of leads.

Hereinafter, in this embodiment, a case in which one of the negative electrode lead 13 and the negative electrode current collector 10 includes nickel and the other includes copper is described.

The negative electrode current collector 10 and the negative electrode lead 13 are joined together in a part of a region in which the negative electrode current collector 10 and the negative electrode lead 13 face each other. Specifically, a plurality of joints 14, at which the negative electrode current collector 10 and the negative electrode lead 13 are joined together, are arranged at certain intervals on the region in which the negative electrode current collector 10 and the negative electrode lead 13 face each other. The negative electrode current collector 10 and the negative electrode lead 13 are electrically connected to each other through the plurality of joints 14.

The lithium layer 12 is disposed on the uncovered regions 10a2 and 10b2 and on the negative electrode active material layer 11 so as to extend from the uncovered region to the negative electrode active material layer. That is, a portion of the lithium layer 12 is disposed on the uncovered region 10a2 or 10b2 of the negative electrode current collector 10, and the other portion is disposed on the negative electrode active material layer 11. On the surface-10a side, the lithium layer 12 is disposed on at least a part of the region between the uncovered region 10a2 and the negative electrode lead 13 except for the regions in which the joints 14 are located. On the surface-10b side, the lithium layer 12 is disposed on substantially the entire surface except for the portions corresponding to the joints 14.

A portion of the lithium layer located on the uncovered region and a portion of the lithium layer located on the negative electrode active material layer may be separated from each other.

In the present invention, it is essential only that the lithium layer be disposed on the uncovered regions. The lithium layer may be disposed only on a region of the surface of the negative electrode current collector on which the negative electrode active material layer is not disposed. In another case, the lithium layer may be disposed both on the region of the surface of the negative electrode current collector on which the negative electrode active material layer is not disposed and on the negative electrode active material layer.

The lithium layer 12 includes metal lithium. The lithium layer 12 is more preferably substantially composed of metal lithium. The lithium layer 12 preferably includes metal lithium in an amount equivalent to or more than the irreversible capacity of the negative electrode active material layer 11 per unit area.

The thickness of the lithium layer 12 is not particularly limited. The thickness of the lithium layer 12 is preferably 0.1 μm or more and is more preferably 1 μm or more in order to supply a sufficient amount of lithium from the lithium layer 12 to the negative electrode active material layer 11 and to thereby further increase the charge/discharge capacity of a lithium secondary battery. However, if the thickness of the lithium layer 12 is excessively large, the charge capacity of a lithium secondary battery may be disadvantageously reduced because it becomes necessary to reduce the thickness of the negative electrode active material layer 11. Thus, the thickness of the lithium layer 12 is preferably 30 μm or less and is more preferably 20 μm or less.

(Method for Producing Negative Electrode 1)

An example method for producing the negative electrode 1 is described below with reference to FIGS. 1 to 5.

A negative electrode active material layer 11 is formed on regions 10a1 and 10b1 of a strip-like negative electrode current collector 10. A method for forming the negative electrode active material layer 11 on the regions 10a1 and 10b1 of the negative electrode current collector 10 is not particularly limited. For example, a negative electrode mixture slurry including the above-described negative electrode active material, a binding agent, and a solvent is prepared. The negative electrode mixture slurry is applied onto the surfaces 10a and 10b of the negative electrode current collector 10 intermittently. Subsequently, drying and rolling are performed to form the negative electrode active material layer 11. At this time, the negative electrode mixture slurry is applied so that uncovered regions 10a2 and 10b2 are located at the end of the negative electrode current collector 10 in the longitudinal direction of the negative electrode current collector 10. In another case, the negative electrode mixture slurry may be applied so that the regions of the surfaces of the negative electrode current collector in which the negative electrode active material layer is not formed are located at, for example, the centers of the surfaces of the negative electrode current collector.

Subsequently, a lithium layer 12 is formed on the surface of the negative electrode active material layer 11 and on the uncovered regions 10a2 and 10b2 of the negative electrode current collector 10 so as to extend from the negative electrode active material layer to the uncovered region. The lithium layer 12 may be formed by, for example, a gas phase method. The lithium layer 12 may be formed by, for example, a vacuum deposition method using the vacuum deposition system 40 illustrated in FIG. 3.

Figure 3:
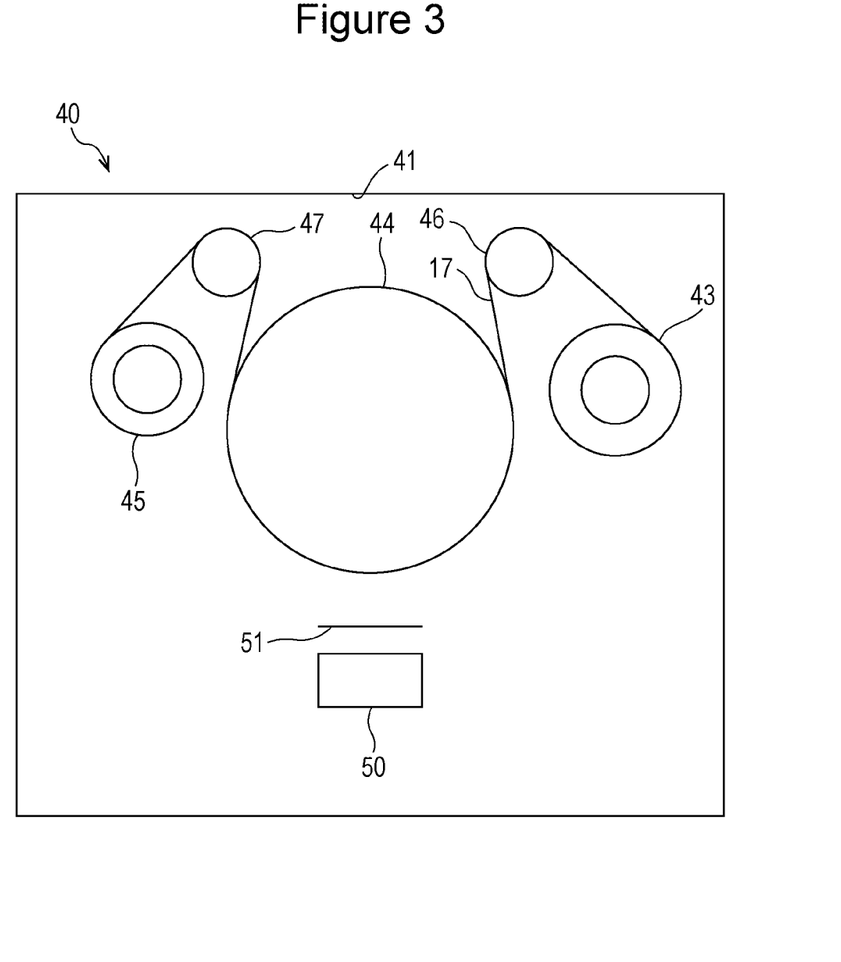
FIG. 3 is a diagram illustrating a vacuum deposition system that can be used in a method for producing a negative electrode for lithium secondary batteries according to an embodiment of the present invention.

The vacuum deposition system 40 includes a vacuum chamber 41. An unwinding roller 43 and a winding roller 45 are disposed inside the vacuum chamber 41. A sheet 17 including the negative electrode current collector 10 and the negative electrode active material layer 11 disposed on the negative electrode current collector 10 is wound around the unwinding roller 43. The sheet 17 is unwound from the unwinding roller 43 and subsequently fed to a winding roller 45 through a guide roller 46, a can 44, and a guide roller 47. Then, the sheet 17 is wound around the winding roller 45.

A lithium source 50 including metal lithium or the like is disposed inside the vacuum chamber 41 so as to face the can 44. When the lithium source 50 is heated by a heater, lithium vapor is supplied onto a potion of the sheet 17 which is located on the can 44. The lithium supplied on the sheet 17 is cooled using a cooling system (not shown in the drawing). In this manner, the lithium layer 12 is formed on the portion of the sheet 17 which is located on the can 44. Thus, in the sheet 17 that has been wound around the winding roller 45, the lithium layer 12 is formed on substantially the entire surface of the negative electrode current collector 10 including the surface of the negative electrode active material layer 11.

A shielding plate 51 is interposed between the can 44 and the lithium source 50 in order to stop scattering of unwanted lithium which may occur while the temperature of the heater is increased or while the temperature of the heater is reduced after formation of the lithium layer 12.

The pressure inside the vacuum chamber 41, the winding speed of the winding roller 45, the lithium source 50, and the like may be set appropriately.

Figure 4:
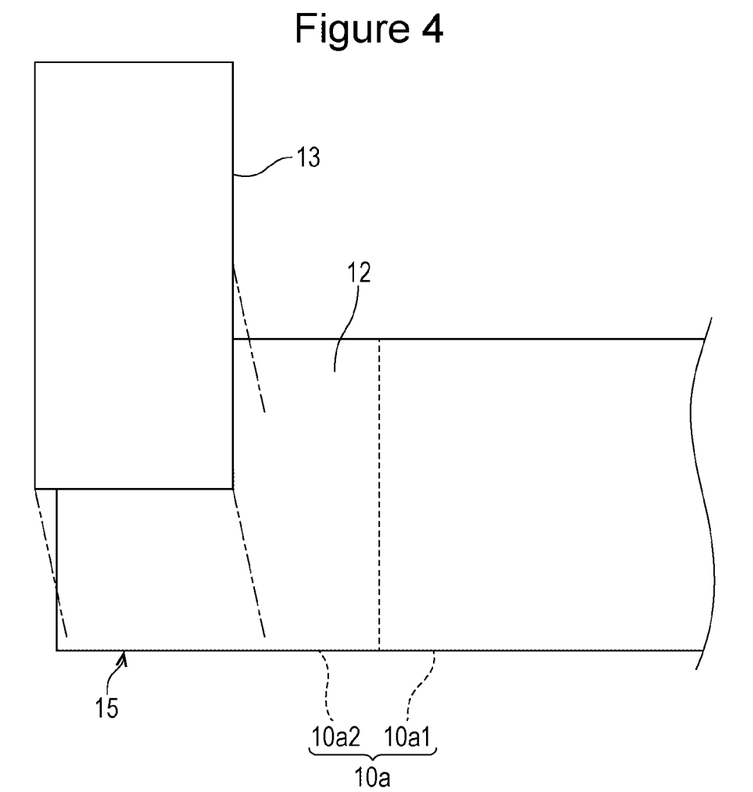
FIG. 4 is a schematic exploded plan view of a negative electrode for lithium secondary batteries according to an embodiment of the present invention, which is used for explaining a method for producing the negative electrode for lithium secondary batteries.

Subsequently, as illustrated in FIG. 4, a negative electrode lead 13 is disposed on the uncovered region 10a2 of the negative electrode current collector 10. Specifically, the negative electrode lead 13 is arranged so that the longitudinal direction of the negative electrode lead 13 intersects the longitudinal direction of the negative electrode current collector 10 at right angles. In the present invention, alternatively, the negative electrode lead 13 may be arranged so that, for example, the longitudinal direction of the negative electrode lead is parallel to the longitudinal direction of the negative electrode current collector.

A position at which the negative electrode lead 13 is disposed may be selected appropriately depending on the following conditions: the form of an electrode assembly included in a lithium secondary battery (e.g., a wound electrode assembly, a flat electrode assembly, or a multilayer electrode assembly), the shape of a lithium secondary battery (e.g., a rectangular shape, a cylindrical shape, a flat shape, a laminated-film pack shape, or a coin shape), and the design of a lithium secondary battery (e.g., dimensions, capacity, and the intended application).

Then, the negative electrode lead 13 is joined onto the uncovered region 10a2 of the negative electrode current collector 10 with the lithium layer 12 interposed therebetween. For example, a resistance welding method may be employed in order to join the negative electrode lead 13 and the negative electrode current collector 10 together. By a resistance welding method, the negative electrode lead 13 and the negative electrode current collector 10 can be suitably joined together even when the lithium layer 12 is interposed therebetween.

Figure 5:
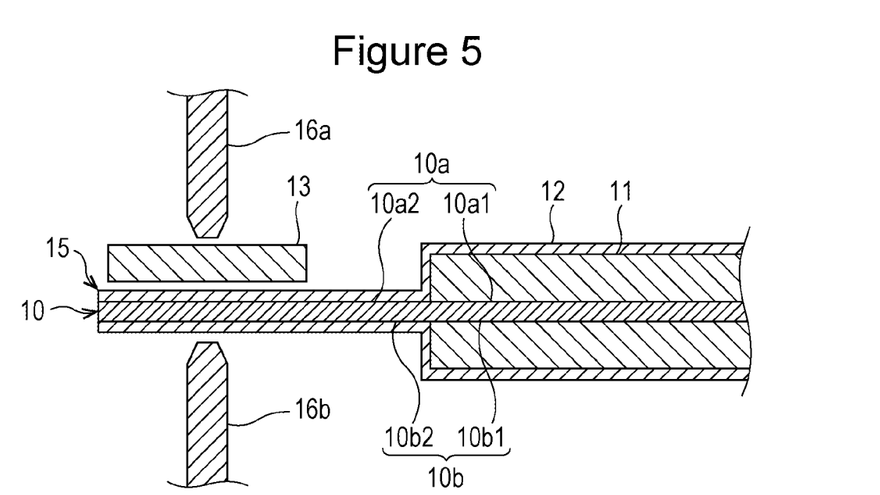
FIG. 5 is a schematic cross-sectional view of a negative electrode for lithium secondary batteries according to an embodiment of the present invention, which is used for explaining a method for producing the negative electrode for lithium secondary batteries.

The negative electrode lead 13 and the negative electrode current collector 10 can be joined together by a resistance welding method, for example, in the following manner. Specifically, as illustrated in FIG. 5, a voltage is applied between terminals 16a and 16b of a resistance welding machine while the negative electrode current collector 10 including the lithium layer 12 formed thereon and the negative electrode lead 13 are pinched between the terminals 16a and 16b and thereby pressurized. This produces a current that flows through the negative electrode lead 13, the lithium layer 12, the negative electrode current collector 10, and the lithium layer 12 that are located between the terminals 16a and 16b. Since the electric resistances at the interfaces at which the negative electrode lead 13, the lithium layer 12, the negative electrode current collector 10, and the lithium layer 12 are brought into contact with one another are high, heat is generated in the negative electrode lead 13, the lithium layer 12, the negative electrode current collector 10, and the lithium layer 12 when a current flows between the terminals 16a and 16b. The melting point of lithium included in the lithium layer 12 is low: about 180° C. Lithium has a lower melting point than, for example, copper and nickel that constitute the negative electrode current collector 10 and the negative electrode lead 13. Therefore, lithium, which has a lower melting point than copper and nickel that constitute the negative electrode current collector 10 and the negative electrode lead 13, is melted to form a lithium melt prior to melting of the negative electrode current collector 10 and the negative electrode lead 13. This lowers the melting points of copper and nickel, which allows joining of the negative electrode current collector 10 to the negative electrode lead 13 to be carried out at a low temperature. As a result, the voltage of the power to be applied between the terminals 16a and 16b can be reduced. Thus, forming the lithium layer 12 on the uncovered regions 10a2 and 10b2 in advance facilitates joining of the negative electrode lead 13 to the negative electrode current collector 10. Facilitating joining of the negative electrode current collector 10 to the negative electrode lead 13 leads to enhancement of the reliability of the connection between the negative electrode lead 13 and the negative electrode current collector 10. In addition, prior to joining of the negative electrode current collector to the negative electrode lead, the lithium layer is not necessarily removed from a portion of the negative electrode current collector onto which the negative electrode lead is to be joined. This reduces the cost for producing the negative electrode 1.

Since copper and nickel can be alloyed together, when one of the negative electrode current collector 10 and the negative electrode lead 13 includes copper and the other includes nickel, joints 14 include an alloy of copper and nickel. However, since lithium is not able to be alloyed with copper nor nickel, the joints 14 include substantially no lithium. The lithium melt formed at the time of joining is ejected outside the joints 14.

The tip diameters of the terminals 16a and 16b and the value of the current that flows between the terminals 16a and 16b may be each selected appropriately depending on the thicknesses, materials, sizes, and the like of the negative electrode current collector 10 and the negative electrode lead 13. The terminals 16a and 16b are preferably made of copper. The tip diameters of the terminals 16a and 16b are preferably within about 1 to 5 mm. The value of the current that flows between the terminals 16a and 16b is preferably within about 100 to 5000 A.

An ultrasonic welding method may also be employed in order to join the negative electrode current collector 10 and the negative electrode lead 13 together. Heat is generated in the negative electrode lead 13, the lithium layer 12, and the negative electrode current collector 10 also in an ultrasonic welding method due to irradiation with an ultrasonic wave, which causes the lithium layer 12 to be molted prior to melting of the negative electrode lead 13 and the negative electrode current collector 10. The resulting lithium melt facilitates joining of the negative electrode lead 13 to the negative electrode current collector 10. This allows the joints 14 to be suitably formed.

(Lithium Secondary Battery 30)

Figure 6:
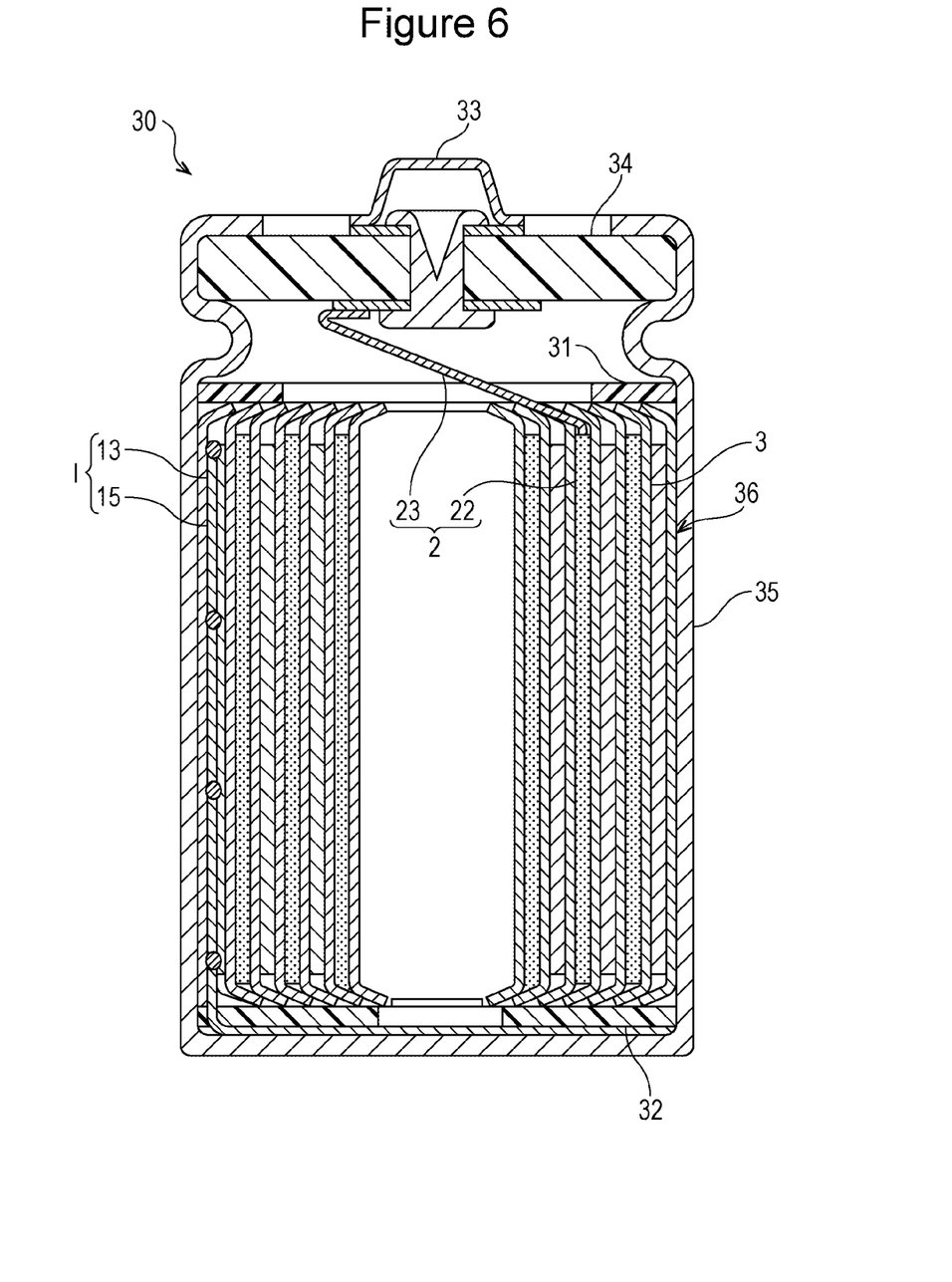
FIG. 6 is a schematic cross-sectional view of a lithium secondary battery according to an embodiment of the present invention.
Figure 7:
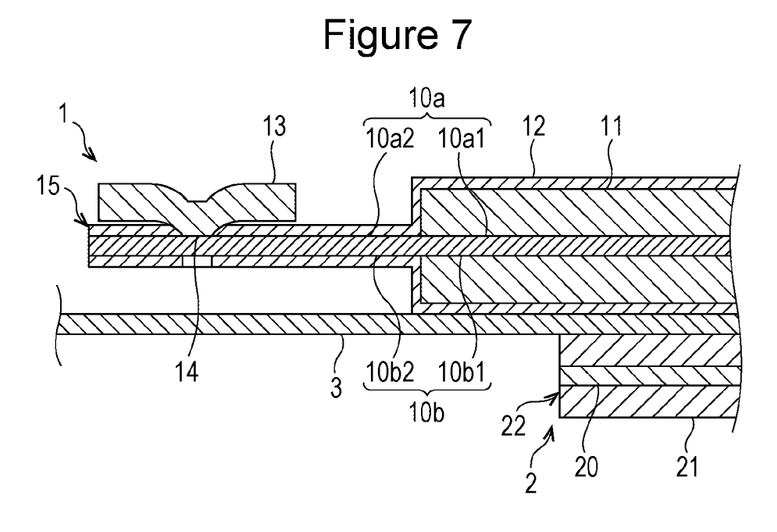
FIG. 7 is a schematic cross-sectional view of a negative electrode, a positive electrode, and a separator that are included in a lithium secondary battery according to an embodiment of the present invention which has not yet been charged and discharged.

A lithium secondary battery 30 including the negative electrode 1 is described below. As illustrated in FIGS. 6 and 7, the lithium secondary battery 30 includes a negative electrode 1, a positive electrode 2, a separator 3, and a nonaqueous electrolyte (not shown in the drawing).

The positive electrode 2 includes a positive electrode plate 22 and a positive electrode lead 23. The positive electrode plate 22 includes a positive electrode current collector 20 and a positive electrode active material layer 21.

The positive electrode current collector 20 may be composed of a conductive material such as stainless steel, titanium, aluminum, or an aluminum alloy. The positive electrode current collector 20 may be, for example, a porous or nonporous conductive substrate. Examples of the porous conductive substrate include a meshed body, a net-like body, a perforated sheet, a metal net, a porous body, a foam, and a nonwoven fabric. Examples of the nonporous conductive substrate include a foil and a film.

The thickness of the positive electrode current collector 20 is preferably, but not particularly limited to, for example, within about 1 to 500 μm, is more preferably within about 1 to 50 μm, and is further preferably within about 10 to 30 μm.

The positive electrode active material layer 21 is disposed on at least one principal surface of the positive electrode current collector 20. In this embodiment, specifically, the positive electrode active material layer 21 is disposed on both principal surfaces of the positive electrode current collector 20. However, the positive electrode active material layer may be disposed on only one principal surface of the positive electrode current collector.

The positive electrode active material layer 21 includes a positive electrode active material. Preferred examples of the positive electrode active material include a lithium-containing composite metal oxide and an olivine-type lithium phosphate.

The lithium-containing composite metal oxide is a metal oxide including lithium and a transition metal element or a metal oxide including lithium and a transition metal element in which the transition metal element is partially replaced by an element other than lithium. Preferred examples of the transition metal element include Sc, Y, Mn, Fe, Co, Ni, Cu, and Cr. Among these transition metal elements, Mn, Co, Ni, and the like are preferably used. Preferred examples of the element other than lithium include Na, Mg, Zn, Al, Pb, Sb, and B. Among these elements, Mg, Al, and the like are preferably used.

Preferred examples of the lithium-containing composite metal oxide include, specifically, $Li_1CoO_2$, $Li_1NiO_2$, $Li_1MnO_2$, $Li_1Co_mNi_{1-m}O_2$, $Li_1CO_mA_{1-m}O_n$, $Li_1Ni_{1-m}A_mO_n$, $Li_1Mn_2O_4$, and $Li_1Mn_{2-m}A_nO_4$ (in each expression, A represents at least one element selected from the group consisting of Sc, Y, Mn, Fe, Co, Ni, Cu, Cr, Na, Mg, Zn, Al, Pb, Sb, and B; $0<1\leq1.2$; m=0 to 0.9; and n=2.0 to 2.3).

Preferred examples of the olivine-type lithium phosphate include, specifically, $LiXPO_4$ and $Li_2XPO_4F$ (in each expression, X represents at least one element selected from the group consisting of Co, Ni, Mn, and Fe).

The molar ratio of lithium in the positive electrode active material is a value measured immediately after preparation of the positive electrode active material. The molar ratio of lithium in the positive electrode active material varies when the lithium secondary battery 30 is charged or discharged.

The above-described positive electrode active materials may be used alone or in a mixture of two or more.

The positive electrode active material layer 21 may further include a conductant agent, a binding agent, and the like.

Preferred examples of the conductant agent include graphites such as natural graphite and artificial graphite; carbon blacks such as acetylene black, Ketjenblack, channel black, furnace black, lamp black, and thermal black; conductive fibers such as carbon fiber and metal fiber; metal powders such as an aluminum powder; and carbon fluoride. The above-described conductant agents may be used alone or in a mixture of two or more.

A preferred example of the binding agent is a resin material. Specific examples of the binding agent include polyvinylidene fluoride, polytetrafluoroethylene, polyhexafluoropropylene, polyethylene, polypropylene, polyamide, polyimide, polyamide-imide, polyacrylonitrile, polymethyl acrylate, polyethyl acrylate, polymethyl methacrylate, polyethyl methacrylate, polyvinyl pyrrolidone, a styrene-butadiene rubber, a modified acrylic rubber, carboxymethylcellulose, and a copolymer of two or more monomers. Examples of the monomer include tetrafluoroethylene, hexafluoropropylene, pentafluoropropylene, perfluoroalkyl vinyl ether, vinylidene fluoride, chlorotrifluoroethylene, ethylene, propylene, acrylic acid, and hexadiene. The above-described binding agents may be used alone or in a mixture of two or more.

The positive electrode active material layer 21 is formed by, for example, applying a positive electrode mixture slurry onto the surface of the positive electrode current collector 20, drying the resulting coating film, and rolling the dried film. The positive electrode mixture slurry may be prepared by, for example, dissolving or dispersing the positive electrode active material, the conductant agent, the binding agent, and the like in an organic solvent. Preferred examples of the organic solvent include dimethylformamide, dimethylacetamide, methylformamide, N-methyl-2-pyrrolidone, dimethylamine, acetone, and cyclohexanone.

The positive electrode lead 23 is joined to portions of the positive electrode current collector 20 at which the positive electrode active material layer 21 is exposed. The positive electrode lead 23 is connected to a positive electrode terminal 33 on the side opposite to the side on which the positive electrode lead 23 is connected to the positive electrode current collector 20. The positive electrode lead 23 may be composed of, for example, aluminum or an aluminum alloy. Preferred examples of the aluminum alloy include an aluminum-silicon alloy, an aluminum-iron alloy, an aluminum-copper alloy, an aluminum-manganese alloy, an aluminum-magnesium alloy, and an aluminum-zinc alloy. A resistance welding method, an ultrasonic welding method, and the like may be employed in order to join the positive electrode current collector 20 and the positive electrode lead 23 together.

The separator 3 is interposed between the positive electrode 2 and the negative electrode 1. The separator 3 may be a sheet or the like having certain ionic permeability, a certain mechanical strength, and an insulating property. The separator 3 is preferably a porous sheet such as a microporous membrane, a woven fabric, or a nonwoven fabric. The separator 3 may be composed of any resin material. However, considering durability, a shut-down function, and the like, the separator 3 is preferably composed of a polyolefin such as polyethylene or polypropylene.

The thickness of the separator 3 is preferably within about 10 to 300 μm, is more preferably within about 10 to 30 μm, and is further preferably within about 10 to 25 μm. The porosity of the separator 3 is preferably within about 30% to about 70% and is more preferably within about 35% to about 60%. Note that the term "porosity" used herein refers to the percentage of the total volume of pores of the separator 3 with respect to the volume of the separator 3.

The separator 3 is impregnated with a lithium-ion-conducting, nonaqueous electrolyte. The nonaqueous electrolyte includes a solute (supporting electrolyte) and a nonaqueous solvent.

Preferred examples of the solute include $LiClO_4$, $LiBF_4$, $LiPF_6$, $LiAlCl_4$, $LiSbF_6$, $LiSCN$, $LiCF_3SO_3$, $LiCF_3CO_2$, $LiAsF_6$, $LiB_{10}Cl_{10}$, a lower aliphatic carboxylic acid lithium salt, LiCl, LiBr, LiI, $LiBCl_4$, borates, and imide salts. The concentration of the solute dissolved in the nonaqueous solvent is preferably 0.5 to 2 mol/L.

Preferred examples of the nonaqueous solvent include a cyclic carbonate ester, a linear carbonate ester, and a cyclic carboxylate ester. Preferred examples of the cyclic carbonate ester include propylene carbonate and ethylene carbonate. Preferred examples of the linear carbonate ester include diethyl carbonate, ethyl methyl carbonate, and dimethyl carbonate. Preferred examples of the cyclic carboxylate ester include γ-butyrolactone and γ-valerolactone. The above-described nonaqueous solvent may be used alone or in a mixture of two or more.

The nonaqueous electrolyte may further include an additive. Preferred examples of the additive include additives capable of increasing the charge/discharge efficiency of the lithium secondary battery 30, such as fluoroethylene carbonate, vinylene carbonate, vinylethylene carbonate, and divinylethylene carbonate; and additives capable of inactivating the lithium secondary battery 30, such as cyclohexylbenzene, biphenyl, and diphenyl ether. The above-described additives may be used alone or in a mixture of two or more.

The negative electrode 1 and the positive electrode 2 are wound with the separator 3 interposed therebetween and thereby form a wound electrode assembly 36 together with the separator 3. The wound electrode assembly 36 is housed in a cylindrical battery case 35 with an upper insulating plate 31 and a lower insulating plate 32 being attached to the respective ends of the wound electrode assembly 36 in the longitudinal direction of the wound electrode assembly 36. The positive electrode lead 23 of the positive electrode 2 and the negative electrode lead 13 of the negative electrode 1 are each connected to a predetermined point. The battery case 35 contains the nonaqueous electrolyte. A sealing plate 34 that supports the positive electrode terminal 33 is attached to the opening portion of the battery case 35. The opening end of the battery case 35 is caulked to the sealing plate 34, and thereby the battery case 35 is sealed.

The upper insulating plate 31, the lower insulating plate 32, and the sealing plate 34 may be each composed of, for example, an electrically insulating material. The electrically insulating material is preferably a resin material, a rubber material, or the like. The battery case 35 is a closed-end cylindrical member having an opening at the end in the longitudinal direction thereof. The battery case 35 and the positive electrode terminal 33 may be each composed of a metal material such as iron or stainless steel.

The lithium secondary battery 30 is a cylindrical battery including the wound electrode assembly 36. However, in the present invention, the shape of the lithium secondary battery is not particularly limited. The lithium secondary battery according to the present invention may be a rectangular battery, a flat battery, a coin-like battery, a laminated-film pack battery, or the like. The lithium secondary battery 30 may include a multilayer electrode assembly or a flat electrode assembly instead of the wound electrode assembly.

FIG. 7 is a schematic cross-sectional view of portions of the negative electrode, the positive electrode, and the separator that are included in the lithium secondary battery 30 that has not yet been charged and discharged. As illustrated in FIG. 7, in the negative electrode 1 of the lithium secondary battery 30 that has not yet been charged and discharged, the lithium layer 12 is disposed both on the negative electrode active material layer 11 and on the uncovered regions 10$a$2 and 10$b$2 of the negative electrode current collector 10. That is, the lithium layer 12 is disposed on substantially the entire surface of the negative electrode current collector 10, which includes the surface of the negative electrode active material layer 11 and a portion on which the negative electrode lead 13 is disposed.

When the lithium secondary battery 30 is charged and discharged, during charge, at least part of lithium included in the lithium layer 12 is caused to be occluded into the negative electrode active material layer 11. Specifically, lithium included in a portion of the lithium layer 12 which is disposed on the negative electrode active material layer 11 is caused to be occluded into the negative electrode active material layer 11. Lithium included in a portion of the lithium layer 12 which is disposed on the uncovered regions 10$a$2 and 10$b$2 of the negative electrode current collector 10 is caused to be occluded into the adjoining negative electrode active material layer 11 through the end of the negative electrode active material layer 11. Thus, when the lithium secondary battery 30 is charged and discharged, the lithium concentration in the negative electrode active material layer 11 can be increased. This reduces the amount of lithium supplied from the positive electrode 2 which is captured by the negative electrode 1 and therefore not released outside during the second or later charges and discharges. Thus, use of the negative electrode 1 may increase the charge/discharge capacity of the lithium secondary battery 30.

Figure 8:
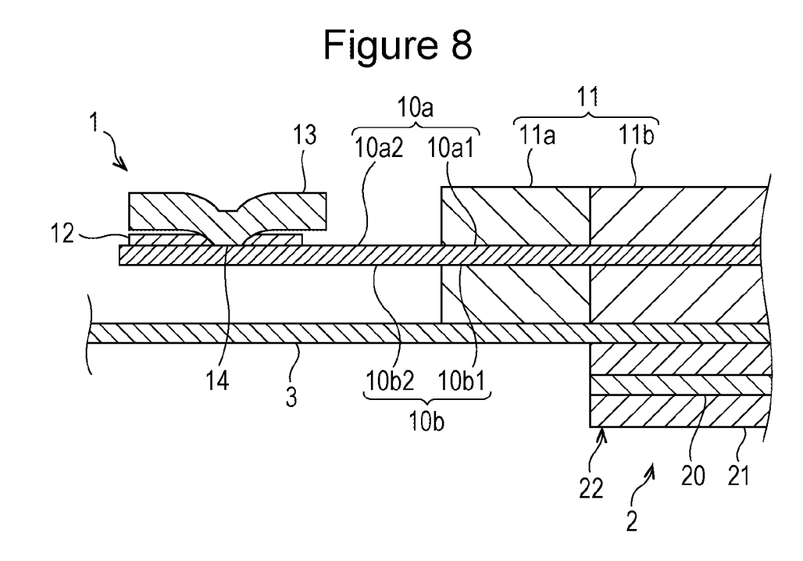
FIG. 8 is a schematic cross-sectional view of a negative electrode, a positive electrode, and a separator that are included in a lithium secondary battery according to an embodiment of the present invention which has been charged and discharged.

Depending on the amount of lithium included in the lithium layer 12, as illustrated in FIG. 8, at least a portion of the lithium layer 12 may disadvantageously be lost or the thickness of the lithium layer 12 may disadvantageously be at least partially reduced compared with that measured prior to charging and discharging due to the occlusion of lithium into the negative electrode active material layer 11.

In the lithium secondary battery, lithium is less likely to be supplied, even during charge, from the positive electrode active material layer into a portion of the negative electrode active material layer which does not face the positive electrode active material layer. Consequently, even after charge, the portion of the negative electrode active material layer which does not face the positive electrode active material layer has a lower potential than a portion of the negative electrode active material layer which faces the positive electrode active material layer. Therefore, lithium is likely to migrate from the portion of the negative electrode active material layer which faces the positive electrode active material layer to the portion of the negative electrode active material layer which does not face the positive electrode active material layer. As a result, the lithium concentration in the portion of the negative electrode active material layer which faces the positive electrode active material layer is reduced when the portion is adjacent to the portion of the negative electrode active material layer which does not face the positive electrode active material layer. On the other hand, the lithium concentration in the portion of the negative electrode active material layer which does not face the positive electrode active material layer is increased although this portion does not contribute to a battery reaction. Thus, when a portion of the negative electrode active material layer does not face the positive electrode active material layer, the battery capacity may be reduced by an amount corresponding to the amount of lithium that migrates from the portion of the negative electrode active material layer which faces the positive electrode active material layer to the portion of the negative electrode active material layer which does not face the positive electrode active material layer.

In the lithium secondary battery 30, the lithium layer 12 is disposed on the uncovered regions 10$a$2 and 10$b$2 of the negative electrode current collector 10. Lithium is supplied from portions of the lithium layer 12 located on the uncovered regions 10$a$2 and 10$b$2 to a portion of the negative electrode active material layer 11 which does not face the positive electrode active material layer 21. This reduces a difference in potential between a portion 11$b$ of the negative electrode active material layer 11 which faces the positive electrode active material layer 21 and a portion 11$a$ of the negative electrode active material layer 11 which does not face the positive electrode active material layer 21. Consequently, the amount of lithium that migrates from the portion 11b of the negative electrode active material layer 11 which faces the positive electrode active material layer 21 to the portion 11a of the negative electrode active material layer 11 which does not face the positive electrode active material layer 21 is small. That is, a reduction in the lithium concentration in the portion 11b of the negative electrode active material layer 11 which faces the positive electrode active material layer 21, which contributes to a battery reaction, is suppressed with effect. Thus, using the negative electrode 1, the charge/discharge capacity of the lithium secondary battery 30 may be increased with effect. Furthermore, the charge-discharge cycle characteristic of the lithium secondary battery 30 may be enhanced.

Lithium migrates from the lithium layer 12 to the portion 11a of the negative electrode active material layer 11 which does not face the positive electrode active material layer 21 even in the case where the lithium layer 12 is disposed only a portion of the uncovered regions 10a2 and 10b2 of the negative electrode current collector 10. This allows lithium included in the portion 11b of the negative electrode active material layer 11 which faces the positive electrode active material layer 21 to contribute to charge and discharge with effect. Thus, even in the above-described case, the charge/discharge capacity and the charge-discharge cycle characteristic of the lithium secondary battery 30 may be enhanced.

As described above, at least a portion of the lithium layer 12 may be lost or the thickness of the lithium layer 12 may be at least partially reduced during the first charge. However, a portion of the lithium layer 12 located between the uncovered region 10a2 or 10b2 and the negative electrode lead 13 is less likely to be lost or the thickness of such a portion is less likely to be reduced during charge. This is presumably because the spacing between the negative electrode lead 13 and the negative electrode current collector 10 is small and therefore lithium included in the portion of lithium layer 12 located therebetween is less likely to migrate toward the negative electrode active material layer 11 in the charge/discharge process of the lithium secondary battery 30. In addition, it is considered that the thickness of the lithium layer 12 is further less likely to be reduced in the case where the region between the negative electrode lead 13 and the negative electrode current collector 10 is sealed with tape or an adhesive, which makes lithium included in the lithium layer 12 to be further less likely to migrate.

The lithium secondary battery 30 may be used, for example, in the same application as the lithium secondary batteries of the related art and, in particular, may be used suitably as a power source for portable electronic devices. Examples of the portable electronic devices include a personal computer, a mobile telephone, a mobile device, a personal digital assistant (PDA), a portable game machine, and a video camera. The lithium secondary battery 30 is expected to be used as a main power supply or an auxiliary power supply for hybrid electric vehicles, electric vehicles, fuel cell powered vehicles, and the like; a power source for driving electric power tools, vacuum cleaners, robots, and the like; a power unit for plug-in HEVs; or the like.

The present invention is described below further in detail on the basis of the following specific examples. However, the present invention is not limited to the following examples, and further modifications of the present invention may be implemented appropriately without departing from the scope of the present invention.

EXAMPLE 1

(1) Preparation of Positive Electrode Active Material

Cobalt sulfate was added to an aqueous $NiSO_4$ solution in such a manner that Ni:Co=8.5:1.5 (molar ratio) to prepare an aqueous solution having a metal ion concentration of 2 mol/liter. A 2-mol/liter aqueous sodium hydroxide solution was gradually added dropwise into the aqueous solution under stirring to neutralize the aqueous solution. Thus, a ternary precipitate having a composition expressed by $Ni_{0.85}Co_{0.15}(OH)_2$ was produced by a coprecipitation method. The precipitate was separated from the aqueous solution by filtration, subsequently washed with water, and dried at 80° C. to prepare a composite hydroxide.

The composite hydroxide was heated in the air at 900° C. for 10 hours to prepare a composite oxide having a composition expressed by $Ni_{0.85}Co_{0.15}O_2$. Subsequently, lithium hydroxide monohydrate was added to the composite oxide so that the sum of the number of Ni atoms and the number of Co atoms was equal to the number of Li atoms, and heating was performed in the air at 800° C. for 10 hours to prepare a lithium-nickel-containing composite metal oxide having a composition expressed by $LiNi_{0.85}Co_{0.15}O_2$. The lithium-nickel-containing composite metal oxide was used as a positive electrode active material. The volume-average diameter of the secondary particles of the positive electrode active material was 10 μm.

(2) Preparation of Positive Electrode

A positive electrode mixture slurry was prepared by mixing 93 g of a powder of the positive electrode active material prepared above, 3 g of acetylene black (conductant agent), 4 g of a polyvinylidene fluoride powder (binding agent), and 50 ml of N-methyl-2-pyrrolidone. The positive electrode mixture slurry was applied onto both surfaces of an aluminum foil (positive electrode current collector) having a thickness of 15 μm. The resulting coating films were dried and subsequently rolled to form positive electrode active material layers each having a thickness of 50 μm. Thus, a 56-mm×205-mm positive electrode plate was prepared. A portion (56 mm×5 mm) of the positive electrode active material layer was removed from both surfaces of the positive electrode plate to form portions at which the positive electrode current collector was exposed. A positive electrode lead made of aluminum was welded to the portion at which the positive electrode current collector was exposed by an ultrasonic welding method. Thus, a positive electrode was prepared.

(3) Preparation of Negative Electrode Plate

A negative electrode mixture slurry was prepared by mixing 90 g of a natural graphite powder (average particle diameter: 20 μm), 9 g of a SiO powder (average particle diameter: 20 μm), 100 g of an aqueous carboxymethylcellulose (CMC) solution having a concentration of 1% by mass, and 1 g of a styrene-butadiene rubber (SBR). The negative electrode mixture slurry was applied onto both surfaces of a copper foil (negative electrode current collector) having a thickness of 10 μm intermittently at intervals of 5 cm in such a manner that each portion had a length of 26 cm. The resulting coating films were dried and then rolled to form negative electrode active material layers each having a thickness of 60 μm.

Subsequently, a lithium layer was formed on the surfaces of the negative electrode active material layer and uncovered regions of the copper foil on which the negative electrode active material layer was not formed. The lithium layer was formed in the following manner. As illustrated in FIG. 3, a strip-like negative electrode current collector including the negative electrode active material layers formed thereon was wound around an unwinding roller 43. Then, a sheet 17 that was the negative electrode current collector including the negative electrode active material layers was transported using a guide roller 46, a can 44, and a guide roller 47. Lithium vapor was supplied onto the sheet 17 when the sheet 17 was located on the surface of the can 44. The lithium vapor was precipitated on the surface of the sheet 17 by being cooled with cooling means (not shown in the drawing) disposed inside the can 44. Thus, a lithium layer was formed. The resulting negative electrode plate including the lithium layer formed thereon was wound around a winding roller 45.

The lithium vapor was generated by heating a lithium source 50 to 560° C. using a heater to cause vaporization. A shielding plate 51 was provided so as to stop scattering of unwanted lithium which might occur while the temperature of the heater was increased or while the temperature of the heater was reduced after formation of the lithium layer. The pressure inside of the vacuum chamber 41 was set to $8.0 \times 10^{-3}$ Pa. The winding speed at which the negative electrode current collector was wound around the winding roller 45 was set to 20 cm/minute. The lithium raw material used was a lithium plate (produced by The Honjo Chemical Corporation). Thus, a lithium layer having a thickness of 5 μm was formed, and a negative electrode plate was prepared.

The negative electrode plate 15 was cut to a piece of 58 mm×260 mm so that the portion (58 mm×50 mm) of the negative electrode current collector on which the negative electrode active material layer was not formed became the end of the piece in the longitudinal direction.

(4) Joining of Negative Electrode Lead

A negative electrode lead having a width of 5 mm, a length of 70 mm, and a thickness of 0.1 mm prepared from a nickel foil (thickness: 0.1 mm) was joined to the piece of the negative electrode plate 15, which was cut to the size described in (3) above, to prepare a negative electrode. Joining of the negative electrode lead was performed by the resistance welding method described below.

The negative electrode lead was superimposed on a portion of the lithium layer which was formed on a region of the negative electrode plate on which the negative electrode active material layer was not formed so that the longitudinal direction of the negative electrode plate was perpendicular to the longitudinal direction of the negative electrode lead. The negative electrode plate and the negative electrode lead were arranged so as to be pinched between two opposing terminals of a resistance welding machine (produced by Miyachi Technos Corp.) having a tip diameter of 2 mm. A load was applied in a direction such that the distance between the two terminals was decreased. The value of current of the resistance welding machine was set to 1200 A, and a current was applied for 10 milliseconds. Welding was performed at further three positions in the longitudinal direction of the negative electrode lead under the same conditions. Thus, joints were formed at four positions in total. A polypropylene tape having a width of 7 mm and a length of 60 mm was adhered both to the upper surface of the negative electrode lead and the rear surfaces of the joints in the longitudinal direction of the negative electrode lead. Thus, a negative electrode was prepared.

(5) Preparation of Lithium Secondary Battery

The positive electrode and the negative electrode prepared above were stacked on top of each other with a polyethylene microporous membrane (separator, product name: Hipore, thickness: 20 μm, produced by Asahi Kasei Corporation) interposed therebetween. The resulting multilayer body was wound to prepare a wound electrode assembly. The other terminal of the positive electrode lead was welded to a positive electrode terminal made of stainless steel. The other terminal of the negative electrode lead was welded to the inner bottom surface of a closed-end cylindrical battery case made of iron. An upper insulating plate made of polyethylene was attached to one end of the wound electrode assembly in the longitudinal direction thereof. A lower insulating plate made of polyethylene was attached to the other end of the wound electrode assembly. Then, the wound electrode assembly was housed in the battery case.

A nonaqueous electrolytic solution prepared by dissolving $LiPF_6$, at a concentration of 1.0 mol/liter, in a mixed solvent including ethylene carbonate and ethyl methyl carbonate at a volume ratio of 1:1 was charged in the battery case. A sealing plate was attached to the opening of the battery case with a polyethylene gasket interposed therebetween. The opening end of the battery case was caulked inside to seal the battery case. Thus, a cylindrical lithium secondary battery A was prepared.

COMPARATIVE EXAMPLE 1

A cylindrical lithium secondary battery B was prepared as in preparation of the battery A except that, in preparation of the negative electrode, the lithium layer was not formed on a region of the copper foil on which the negative electrode active material layer was not formed by adhering polyimide tape to the region of the copper foil on which the negative electrode active material layer was not formed and then removing the polyimide tape subsequent to the vapor deposition of lithium.

COMPARATIVE EXAMPLE 2

A negative electrode was prepared as in Example 1 except that, in preparation of the negative electrode, a region of the copper foil on which the negative electrode active material layer was not formed was absent but the negative electrode active material layer was formed over the entire surface of the copper foil. In Comparative example 2, a negative electrode lead was disposed on the surface of the negative electrode active material layer, and welding by a resistance welding method was attempted. However, it was impossible to join the negative electrode active material layer and the negative electrode lead together.

[Observation of Joints Between Negative Electrode Current Collector and Negative Electrode Lead]

For each of the negative electrodes prepared in Example 1 and Comparative example 1, a cross section of the negative electrode which included the vicinity of portions of the negative electrode to which the negative electrode lead was joined was exposed by grinding, and the size of the joints was measured using a metallurgical microscope. Table 1 shows the results.

[Battery Capacity after Assembling of Battery]

Each of the batteries A and B prepared in Example 1 and Comparative example 1, respectively, was placed in a thermostat kept at 20° C. and charged by the constant-current constant-voltage method described below.

The battery A and battery B were each charged at a constant current charging rate of 1 It (1 It is the value of current at which the battery capacity can be totally exhausted in 1 hour) until the battery voltage reached 4.2 V. The charged batteries were placed in a thermostat kept at 40° C. and stored for 3 days. Subsequently, the batteries were discharged at a constant current discharging rate of 1 It until the battery voltage reached 2.5 V. The batteries were charged and discharged in the same manner, and the charge/discharge capacities of the batteries were measured. Table 1 shows the charge/discharge capacity of the battery B based on 100% of the charge/discharge capacity of the battery A.

[Observation of Negative Electrode after Measurement of Charge/Discharge Capacity]

After the charge/discharge capacity of each battery was measured, the battery A was disassembled, and a region of the negative electrode current collector of the negative electrode on which the negative electrode active material layer was not formed was observed. As a result, it was found that a portion of the lithium layer formed on the region of the negative electrode current collector on which the negative electrode active material layer was not formed had been partially lost. The tape adhered to the negative electrode lead was removed, and an observation was made. As a result, it was found that a portion of lithium layer located below the negative electrode lead remained.

[Charge-Discharge Cycle Characteristic]

For each of the lithium secondary batteries prepared in Example 1 and Comparative example 1, three sample batteries were prepared. The sample batteries were placed in a thermostat kept at 20° C. and charged by the following constant voltage method.

The batteries were each charged at a constant current charging rate of 1 It (1 It is the value of current at which the battery capacity can be totally exhausted in 1 hour) until the battery voltage reached 4.2 V. After the battery voltage reached 4.2 V, the batteries were each charged at a constant voltage of 4.2 V until the value of current reached 0.05 It. After a 20-min pause, the charged batteries were each discharged at a constant current discharging rate of 1 It, which was a high rate, until the battery voltage reached 2.5 V. The above-described charge/discharge cycle were repeated 100 times.

The ratio of entire discharge capacity measured at the 100th time to the entire discharge capacity measured at the first time was calculated on a percentage basis. The calculated ratios were averaged, and the average is shown as capacity retention rate in Table 1.

TABLE 1

| | Joint size (mm) | Charge-discharge capacity (%) | Capacity retention rate (%) |
|---|---|---|---|
| Example 1 | 1.8 | 100 | 90 |
| Comparative example 1 | 1.1 | 93 | 81 |
| Comparative example 2 | — | — | — |

As shown in Table 1, the battery A prepared in Example 1 had larger joints than the battery B prepared in Comparative example 1. This shows that, in the battery A, the negative electrode current collector and the negative electrode lead were firmly joined together and that the joints between the negative electrode current collector and the negative electrode lead had a low electrical resistance. In the battery B, although the negative electrode current collector and the negative electrode lead were also joined together, the joints between the negative electrode current collector and the negative electrode lead were small compared with the battery A.

The battery A had a higher charge/discharge capacity than the battery B. Since the lithium layer formed on the surface of the negative electrode current collector of the battery A was partially lost subsequent to the evaluation of the charge/discharge capacity of the battery A, the lost lithium layer is considered to be occluded into the adjoining negative electrode active material layer. The battery A had a higher capacity retention rate than the battery B. This is presumably because lithium included in a portion of the lithium layer which was formed on the surface of the negative electrode current collector was occluded into a portion of the negative electrode active material layer which did not face the positive electrode active material layer, which suppressed migration of lithium from a portion of the negative electrode active material layer which faced the positive electrode active material layer to the portion of the negative electrode active material layer which did not face the positive electrode active material layer.

REFERENCE SIGNS LIST

1 . . . Negative electrode for lithium secondary batteries
10 . . . Negative electrode current collector
10a and 10b . . . Surfaces of the negative electrode current collector
10a1 and 10b1 . . . Regions of the surface of the negative electrode current collector
10a2 and 10b2 . . . Uncovered regions
11 . . . Negative electrode active material layer
11a and 11b . . . Portions of the negative electrode active material layer
12 . . . Lithium layer
13 . . . Negative electrode lead
14 . . . Joint
15 . . . Negative electrode plate
16a and 16b . . . Terminals
17 . . . Sheet
2 . . . Positive electrode
20 . . . Positive electrode current collector
21 . . . Positive electrode active material layer
22 . . . Positive electrode plate
23 . . . Positive electrode lead
3 . . . Separator
30 . . . Lithium secondary battery
31 . . . Upper insulating plate
32 . . . Lower insulating plate
33 . . . Positive electrode terminal
34 . . . Sealing plate
35 . . . Battery case
36 . . . Wound electrode assembly
40 . . . Vacuum deposition system
41 . . . Vacuum chamber
43 . . . Unwinding roller
44 . . . Can
45 . . . Winding roller
46 and 47 . . . Guide rollers
50 . . . Lithium source
51 . . . Shielding plate

The invention claimed is:

1. A negative electrode for lithium secondary batteries, the negative electrode comprising:
   a negative electrode current collector;
   a negative electrode active material layer disposed on a region of a surface of the negative electrode current collector;
   a lithium layer including metal lithium, the lithium layer being disposed on an uncovered region, the uncovered region being a region of the surface of the negative electrode current on which the negative electrode active material layer is not disposed;
   the negative electrode further comprising a negative electrode lead connected to the uncovered region of the negative electrode current collector,
   wherein the lithium layer is disposed at least partially between the negative electrode lead and the negative electrode current collector,
   the negative electrode further comprising the negative electrode lead connected to and welded on a top of the uncovered region of the negative electrode current collector,
   the lithium layer is beneath the negative electrode lead and is between the negative electrode lead located on the uncovered region of the negative electrode current collector and the negative electrode current color, and
   wherein the lithium layer is disposed under the negative electrode lead which is at least partially between the negative electrode lead and the negative electrode current collector.

2. The negative electrode for lithium secondary batteries according to claim 1,
   wherein the lithium layer being disposed on the uncovered region has a thickness of 0.1 μm or more and 30 μm or less.

3. The negative electrode for lithium secondary batteries according to claim 1,
   wherein the negative electrode active material layer includes silicon.

4. The negative electrode for lithium secondary batteries according to claim 1,
   wherein a portion of the lithium layer is disposed on the negative electrode active material layer.

5. The negative electrode for lithium secondary batteries according to claim 1,
   wherein the uncovered region is located at an end of the negative electrode current collector in a longitudinal direction of the negative electrode current collector.

6. A lithium secondary battery comprising:
   negative electrode for lithium secondary batteries according to claim 1;
   a positive electrode;
   a separator disposed between the positive electrode and the negative electrode for lithium secondary batteries; and
   a nonaqueous electrolyte.

7. The lithium secondary battery according to claim 6,
   wherein the positive electrode includes
   a positive electrode current collector, and
   a positive electrode active material layer disposed on the positive electrode current collector, and
   wherein a portion adjoining to the uncovered region does not face the positive electrode active material layer.

* * * * *